(12) United States Patent
Yamada et al.

(10) Patent No.: US 6,382,838 B1
(45) Date of Patent: May 7, 2002

(54) PLAIN BEARING

(75) Inventors: Tatsuo Yamada; Toshiaki Kawachi; Hideo Ishikawa; Takayuki Shibayama, all of Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 42 days.

(21) Appl. No.: 09/661,562

(22) Filed: Sep. 14, 2000

(30) Foreign Application Priority Data

Sep. 14, 1999 (JP) ............................................. 11-261010

(51) Int. Cl.[7] ................................................. F16C 9/02
(52) U.S. Cl. ....................................... 384/294; 384/291
(58) Field of Search ................................. 384/294, 291, 384/292, 288, 276

(56) References Cited

U.S. PATENT DOCUMENTS

| | | | | |
|---|---|---|---|---|
| 5,238,311 A | * | 8/1993 | Katou et al. | ................. 384/288 |
| 5,730,097 A | * | 3/1998 | Aoyama | ..................... 384/278 |
| 6,089,756 A | * | 7/2000 | Ono et al. | .................. 384/283 |

* cited by examiner

*Primary Examiner*—Lenard A. Footland
(74) *Attorney, Agent, or Firm*—Browdy and Neimark, P.L.L.C.

(57) ABSTRACT

Disclosed is a plain bearing having a back metal, a bearing alloy layer and an overlay layer, in which the bearing alloy layer and the overlay layer are formed on the inner surface of the metal in this order. The inner surface of the bearing alloy is provided with circumferential broad width recesses and narrow recesses in which the overlay material is filled. The fatigue resistance and were resistance are ensured by the zone of the narrow width recesses. The plain bearing exhibits high embeddability for a foreign substance by presence of the zone of the broad width recesses.

9 Claims, 4 Drawing Sheets

AXIAL DIRECTION

AXIAL DIRECTION

AXIAL DIRECTION

AXIAL DIRECTION

PLAIN BEARING

BACKGROUND OF THE INVENTION

The present invention relates to a plain bearing, especially the plain bearing having a back metal on whose inner surface a bearing alloy layer and an overlay layer are provided in this order.

PRIOR ART

There has been known a plain bearing in which a bearing alloy layer is provided on a back metal and an overlay layer is provided on the bearing alloy layer thereby providing the bearing with improved properties of conformability and embeddability for foreign substances, the overlay layer consisting of a soft material such as a Pb—Sn alloy. There has been also known a plain bearing in which an intermediate layer is provided between a bearing alloy layer and an overlay layer in order to prevent a component of the overlay layer from diffusing into the bearing alloy layer and improve adhesiveness of the overlay layer to the bearing alloy layer.

It is important to internal-combustion engines, for example, how to fully reduce an energy loss when transforming kinetic energy from combustion cylinders into rotary motion through a crank shaft. To this end, it is necessary for the crank shaft and bearings to be machined with a high accuracy with regard to the geometry such as straightness and circularity of the crank shaft and the measurements of the bearings. But, since the crank shaft is not a real rigid body, it bends under dynamic rotational motion to cause disorder of measurements. A solution therefor has been to provide a soft material layer on the outermost surface of the bearing.

But, in recent high performance engines, since bearings receive a high surface load, it is impossible to avoid a direct contact between the mating shaft and the bearings due to a change of oil film after wear loss of the soft material layer as a running-in layer which absorbs the disorder of measurements at an initial running stage. Thus, an overlay layer per se suffers progressive wear to soon expose a hard bearing alloy layer. In such a state, if there are contained machining chips, a substance of deteriorated oil and so on in lubricant oil, a seizure will occur at the sliding-contact interface between the shaft and the bearings.

Accordingly, there has been known a plain bearing as shown in FIG. 7, which comprises a bearing alloy layer 61 on whose inner surface grooves (or recesses) 64 are formed and an intermediate layer 62 is provided so as to follow the grooves 64. According to such a layered structure, even if an overlay layer 63 wears to expose the intermediate layer 62, there will appear a state that a soft material of the overlay layer 63 in the grooves co-exists with the exposed intermediate layer thereby ensuring anti-seizure property of the plain bearing.

Since such grooves are, typically, formed spirally by fine boring machining, they extend parallel with one another in a circumferential direction of the bearing so as to have a constant pitch. In operation of the plain bearing, when the overlay layer wears progressively, there will appear a stripe pattern extending circumferentially and consisting of the bearing alloy layer and the overlay layer. In this state, when a foreign substance enters between the plain bearing and the mating shaft, it will be embedded in the overlay layer remaining in the grooves or recesses to exhibit an improvement effect of the anti-seizure property.

With regard to the above plain bearing, in the case where an area fraction rate of the grooves or recesses is relatively small, namely an exposure area of the bearing alloy layer is large, although excellent fatigue resistance and wear resistance can be obtained, the embeddability for a foreign substance is deteriorated resulting in inferior anti-seizure property. On the other hand, if an area fraction rate of the grooves or recesses is made relatively large, the embeddability for a foreign substance will become excellent.

However, because the conventional plain bearing has been provided with uniform grooves or recesses on the inner surface of the bearing alloy layer, there is a limitation in making the plain bearing excellent in fatigue resistance, wear resistance and anti-seizure property.

BRIEF SUMMARY OF THE INVENTION

Thus, the present invention is directed to a plain bearing which is provided with a plural types of circumferential recessed zone, which comprise a zone type of broad width recesses and another zone type of narrow width recesses, on the inner surface of the bearing alloy layer to have enhanced embeddability for a foreign substance while ensuring good fatigue and wear resistance properties.

According to the invention, there is provided the plain bearing comprising a back metal, a bearing alloy layer and an overlay layer, in which the bearing alloy layer and the overlay layer are formed on the inner surface of the back metal in this order, wherein the inner surface of the bearing alloy is provided with a plural types of circumferential recessed zone which comprise a zone type of broad width recesses and another zone type of narrow width recesses, and the recesses are filled with the overlay material.

According to the above structure, fatigue and wear resistance properties can be ensured by the presence of the zone type of narrow width recesses. On the other hand, the plain bearing exhibits enhanced embeddability for a foreign substance by the zone type of broad width recesses.

Typically, the bearing alloy layer is made from a Cu alloy or an Al alloy. The overlay layer may be optionally made from Pb, a Pb alloy, Sn, an Sn alloy, or a resin suitable for a sliding-contact application, e.g. PTFE or PFA.

In order to form the plural types of circumferential recessed zone, which have different area fraction rates with one another, on the inner surface of the bearing alloy layer, the masking-etching method is desirable because of a highest flexibility in designing the recess pattern. The forming method of the plural types of circumferential recessed zone is optional and may be the conventional boring machining by which grooves can be formed spirally on the inner surface of the bearing alloy layer. In the case of the boring machining, a feeding rate of the cutting tool is changed, as a first option, during machining in order to form the plural types of circumferential recessed zone, and a plurality grooves are simultaneously formed with utilization of a plurality of cutting tools, as a second option.

With regard to the overlay layer, it may be formed directly on the bearing alloy layer, or an intermediate layer made of Ni or Ag, for example, may be provided between the bearing alloy layer and the overlay layer to enhance adhesiveness and prevent a component element of the overlay layer from diffusing into the bearing alloy layer. The intermediate layer may be made of an Ni alloy, Cu, a Cu alloy, Co, a Co alloy, Sn, an Sn alloy, an Ag alloy, Zn or a Zn alloy other than Ni and Ag, as occasion demands.

Even if the intermediate layer is made of a hard material and the overlay layer wears to expose the intermediate layer, because the bearing alloy layer is provided with the recesses on the inner surface, the hard intermediate layer is never exposed through the whole exposure surface, whereby anti-seizure property can be ensured.

With regard to arrangement of the plural zone types of circumferential recesses, a narrow width recess and a broad width recess may be arranged alternately or randomly in the axial direction, or two groups of the plural zone types of circumferential recesses, which consist of a plural rows of the narrow recesses and another plural rows of the broad recesses, may be arrange alternately in the axial direction.

According to the invention plain bearing which comprises the back metal, the bearing alloy layer and the overlay layer being formed in this order, and in which the inner surface of the bearing alloy is provided with the recesses of the plural types of circumferential recessed zone in a dispersed manner and the recesses are filled with the overlay material, it is possible to attain excellent anti-seizure property, fatigue resistance and wear resistance.

With reference to the attached drawings, preferred embodiments of the plain bearing according to the invention will be described herein below.

BRIEF DESCRIPTION OF PREFERRED EMBODIMENTS OF THE INVENTION

Figure 1:
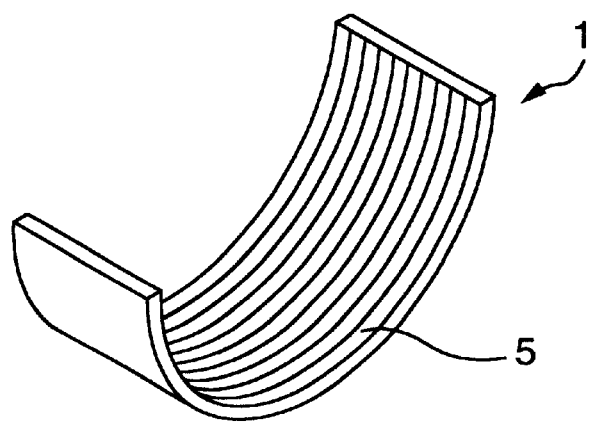
FIG. 1 is a perspective view of a plain bearing of a first embodiment according to the invention, which shows the surface of an intermediate layer by omitting an inner overlay layer.
Figure 2:
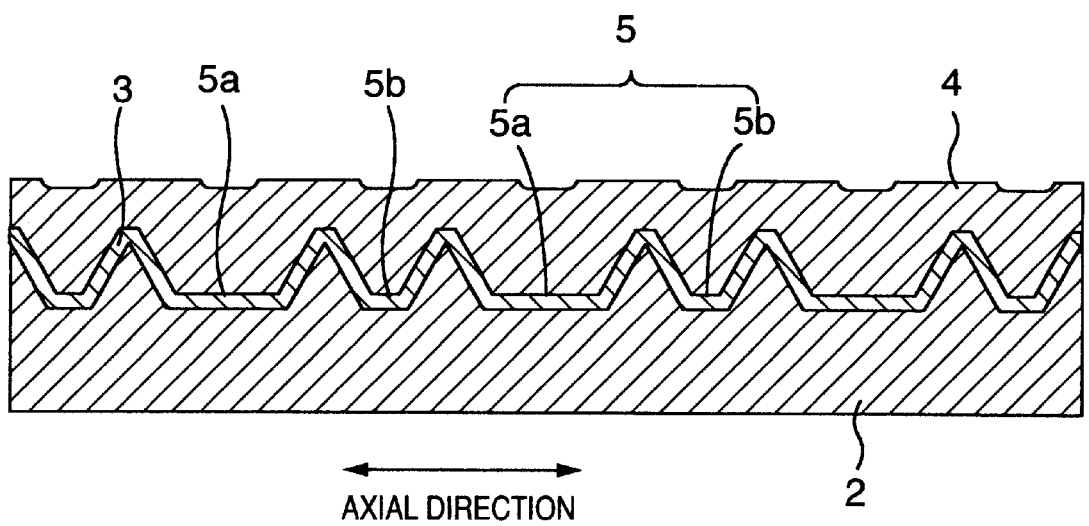
FIG. 2 is an enlarged cross sectional view of the plain bearing with the inner overlay layer shown in FIG. 1, which is taken along axially.

Referring to FIGS. 1 and 2, a plain bearing 1 of a first embodiment according to the invention will be described, which is of a hemi-cylindrical form having an outer diameter of 56 mm and a width of 26 mm and which is provided with recesses by boring machining. The plain bearing 1 consists of a back steel; a bearing alloy layer 2 made of a copper alloy which is provided on the inner surface of the back steel; an intermediate layer 3 made of Ni which is provided on the inner surface of the bearing alloy layer 2 and has a thickness of 1.5 μm; and an overlay layer 4 made of a Pb—Sn alloy which is provided on the intermediate layer 3 and has a thickness of 20 μm.

The bearing alloy layer 2 is provided with a plurality of circumferential recesses or grooves 5 on the whole inner surface thereof which is a connecting surface to the intermediate layer 3. The recesses 5 have a depth of about 20 μm and two types of width which are a broad width of 60 μm and a narrow width of 35 μm. The particulars of the recesses are that two types of broad width recesses 5a and narrow width recesses 5b are arranged alternately in the axial direction of the bearing.

Here a method of producing the plain bearing 1 is described.

(1) A prepared bimetal plate (not shown) is cut, which consists of a back steel and a bearing alloy layer made of a copper alloy being bonded to the back steel. The cut bimetal piece is bent to have a hemi-cylindrical shape by press forming. Thereafter, all the ends of the formed bimetal piece are subjected to finish machining.

(2) The inner surface of the bearing alloy layer of the formed bimetal piece is subjected to boring machining by a boring machine with two types of cutting tools; one of which is for forming the broad width recesses 5a and the other of which is for forming the narrow width recesses 5b.

(3) The bimetal piece provided with the recesses 5a and 5b are subjected to the electrolytic cleaning treatment.

(4) The cleaned bimetal piece is subjected to an nickel plating treatment to form the intermediate layer 3 of Ni having a thickness of 1.5 μm on the bearing alloy layer 2.

(5) The Ni-plated bimetal piece is subjected to a Pb—Sn plating treatment to form the overlay layer 4 having a thickness of 20 μm on the intermediate layer 3. The bimetal piece with the overlay is subjected to machining treatment so that the plain bearing 1 is obtained.

When the plain bearing 1 is actually mounted in a housing (not shown) and subjected to an operation, the overlay layer 4 progressively wears to expose the bearing alloy layer 2, so that the mating shaft will be supported by the bearing alloy layer 2. In that case, because the fraction area rate of the bearing alloy layer 2 at first type zones of the narrow width recesses 5b is relatively high, the plain bearing 1 exhibits high fatigue and wear resistance. On the other hand, because the fraction area rate of the overlay material 4 at second type zones of the broad width recesses 5a is relatively high, the plain bearing 1 exhibits satisfactory embeddability for a foreign substance.

Figure 3:
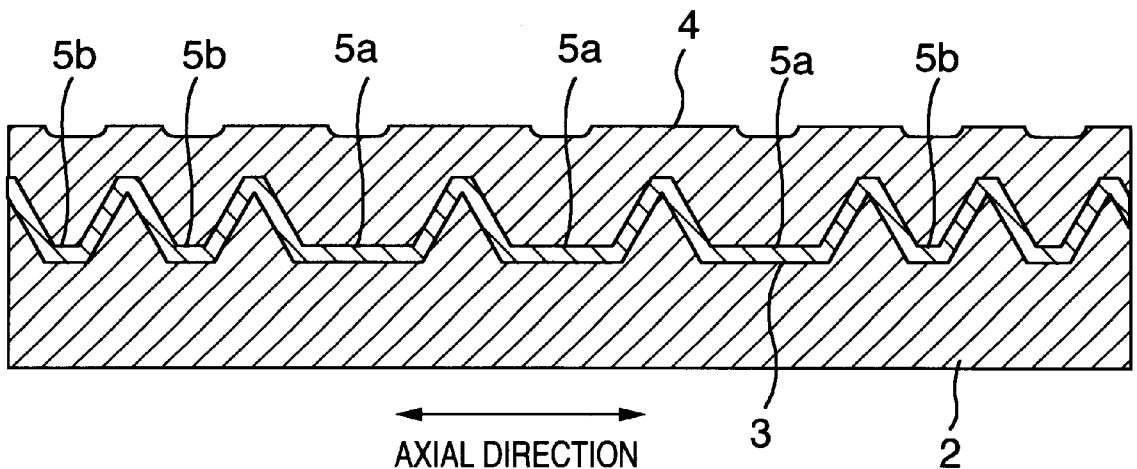
FIG. 3 is an enlarged cross sectional view of a modified embodiment of the plain bearing shown in FIG. 2.

FIG. 3 shows a modified embodiment of the recess pattern in which a first and a second type zones of recesses are formed, the first type zone comprising three rows of broad width recesses 5a and the second zone comprising two rows of narrow width recesses 5b.

Figure 4:
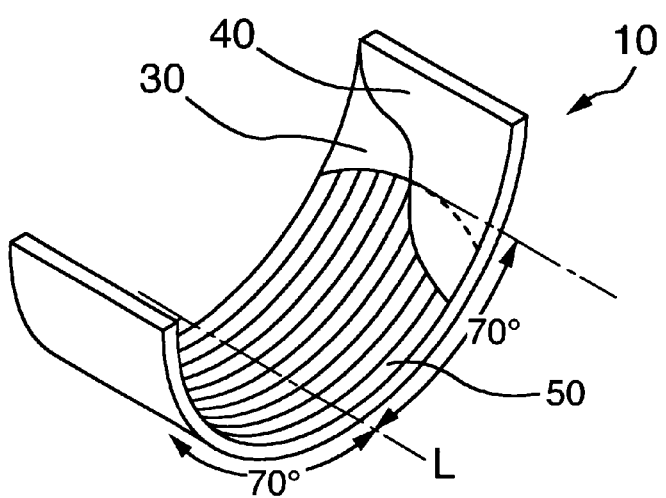
FIG. 4 is a perspective view of a plain bearing of a second embodiment according to the invention, of which inner overlay layer is almost omitted.
Figure 5:
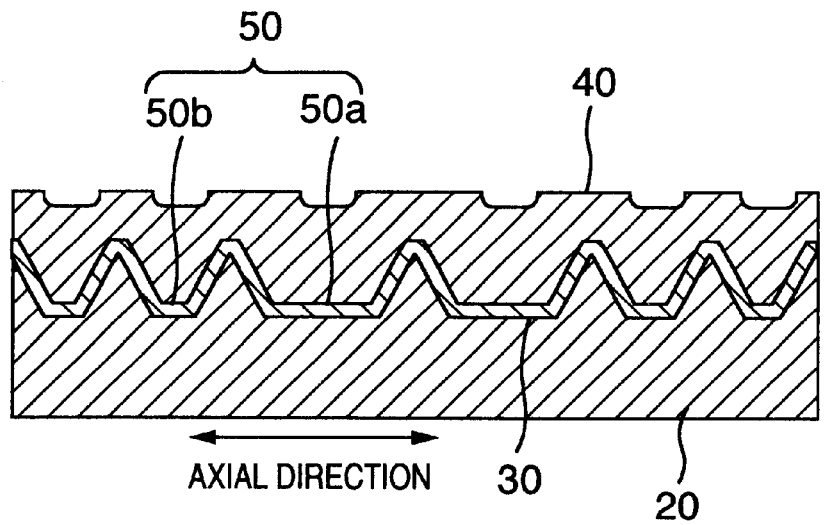
FIG. 5 is an enlarged cross sectional view of the plain bearing with the inner overlay layer shown in FIG. 4, which is taken along axially.
Figure 6:
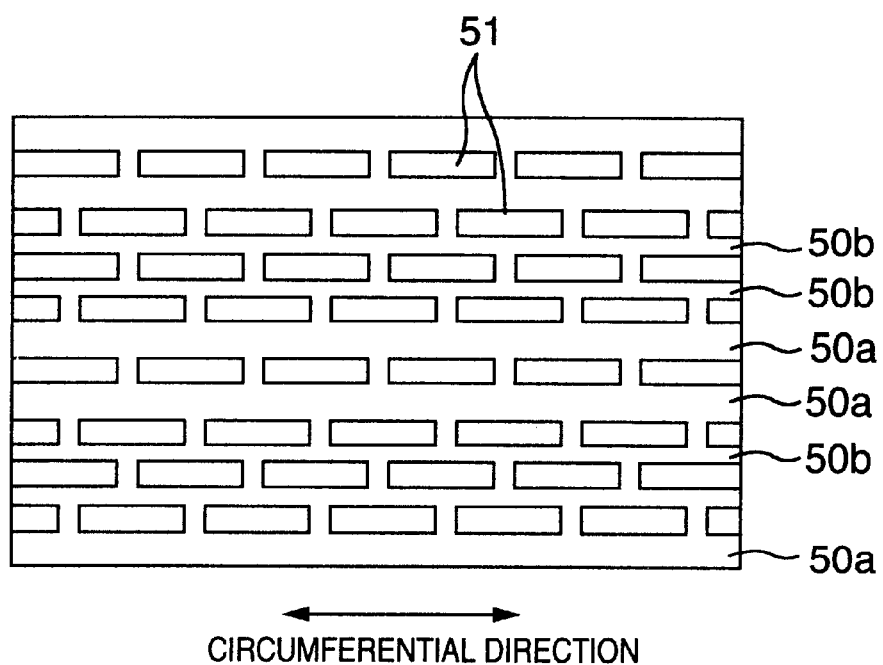
FIG. 6 is an enlarged view of the inner surface of the plain bearing shown in FIG. 4, while omitting the inner overlay layer.
Figure 7:
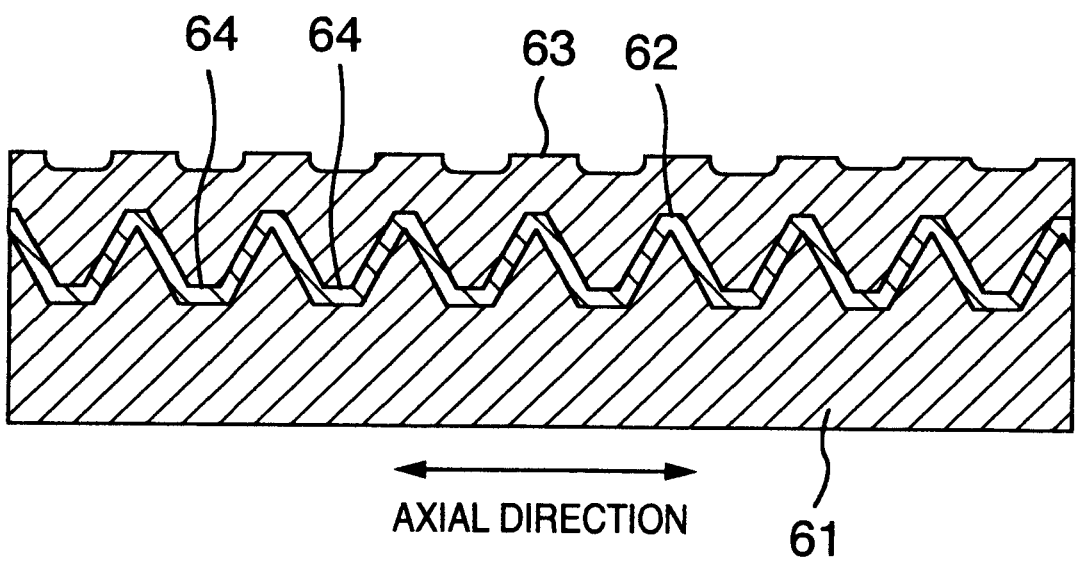
FIG. 7 is a cross sectional view of a conventional plain bearing, which is similar to FIGS. 2, 3 and 5.

Referring to FIGS. 4 to 6, a plain bearing 10 of another embodiment according to the invention will be described, which is of a hemi-cylindrical form having an outer diameter of 56 mm and a width of 26 mm, being the same as the above first embodiment, and which is provided with recesses by etching with utilization of a mask. The plain bearing 10 consists of a back steel; a bearing alloy layer 20 made of a copper alloy which is provided on the inner surface of the back steel; an intermediate layer 30 made of Ni which is provided on the inner surface of the bearing alloy layer 20 and has a thickness of 1.5 μm; and an overlay layer 40 made of a Pb—Sn alloy which is provided on the intermediate layer 30 and has a thickness of 20 μm.

The plain bearing 10 is formed with regard to the mating shaft, taking operational conditions into consideration, such that the oil film to be formed between the plain bearing and the shaft will have a minimum thickness at the circumferential central zone of the plain bearing. Thus, by etching treatment the bearing alloy layer 20 is provided with a plurality of circumferential recesses 50 on the inner surface thereof, on which the overlay layer 40 is formed, within an angle range of 70° (around the axis of the plain bearing 10) from the center line L of the circumferential bearing length toward the respective circumferential ends of the bearing. There is not formed the recesses 50 in the both circumferential end regions as can be seen from FIG. 4. Details of the circumferential recesses 50 are shown in FIG. 6. In the etched surface of the bearing alloy layer 20, protrusions 51 remains without removing by masking-etching and extend intermittently and continuously by a respective circumferential length of 160 μm.

The recesses 50 have a depth of about 20 μm and can be classified to two groups, a first group of which consists of a plural rows of broad recesses 50*a* having 60 μm of width and a second group of which consists of a plural rows of narrow recesses 50*b* having 35 μm of width.

Here a method of producing the plain bearing 10 is described.

(1) The plain bearing 10 is produced by a generally the same way asa first embodiment.

(2) A prepared bimetal consisting of a back steel and a bearing alloy layer is bent to have a hemi-cylindrical shape by press forming. Thereafter, all the ends of the formed bimetal piece are subjected to finish machining.

(3) The formed bimetal piece is subjected to a pre-treatment of degreasing by water cleaning, electrolytic degreasing and pickling in this order.

(4) The cleaned bimetal piece is provided with a mask on the bearing alloy for the etching treatment. When producing the embodiment plain bearing 10, actually the mask was formed by the pad printing method with utilization of a masking material of HER300 (Trade Mark) provided from Okumura Seiyaku Kohgyo K.K., which has excellent resistance to acid and alkali. A pattern of recesses provided by the pad printing method may be optionally selected (see FIG. 6). The remaining whole surface of the bimetal piece, including the inner surface, the back surface and the all ends, other than the etching area is coated by applying the masking material of HER300 (Trade Mark).

(5) Etching Process: The masked bimetal piece is subjected to the electrolytic etching treatment with utilization of an etching solution containing 20 ml/liter of nitric acid, 20 ml/liter of hydrochloric acid and 20 ml/liter of hydrogen peroxide under the conditions of 2 $A/dm^2$ of a current density at 20° C. of temperature for 10 minutes. Thereby the bimetal piece is etched by a depth of 20 μm at the area being not coated with a mask provided by the pad printing method to form the recesses 50 while the remaining coated area is left without etching. The etching depth is adjustable by appropriately changing the etching conditions. After the etching treatment, the bimetal piece is cleaned by water and the mask is removed therefrom.

(6) The cleaned bimetal piece is subjected to electrolytic cleaning, thereafter an intermediate layer 30 made of Ni having a thickness of 1.5 μm is plated on the etched surface of the bearing alloy layer 20. The intermediate layer 30 is formed on the bearing alloy layer 20 so as to follow and coat the recesses 50 and the protrusions 51 as the inner surface. Subsequently, a overlay layer 40 made of a Pb—Sn alloy having a thickness of 20 μm is plated on the intermediate layer 30. The thus processed plain bearing piece is subjected to finish-machining so that the plain bearing 10 is attained as shown in FIG. 4.

When the plain bearing 10 is actually mounted in a housing (not shown) and subjected to an operation, the overlay layer 40 progressively wears to expose the bearing alloy layer 20, so that the mating shaft will be supported by the bearing alloy layer 20. In that case, because the fraction area rate of the bearing alloy layer 20 at first type zones of the narrow width recesses 50*b* is relatively high, the plain bearing 10 exhibits high fatigue and wear resistance. On the other hand, because the fraction area rate of the overlay material 40 at second type zones of the broad width recesses 50*a* is relatively high, the plain bearing 10 exhibits satisfactory embeddability for a foreign substance.

While the two embodiments of the invention have been described above, the invention is not restricted to the embodiments and can be carried out within a scope without departing from the invention principle as is exemplified below.

(1) In the above embodiments, although the overlay layers 4 and 40 of a Pb—Sn alloy has been provided as a sliding-contact surface layer, respectively, it is possible to omit the overlay layer so as to expose the bearing alloy layers 2, 20 and partially remove the surface layer by finish-machining to expose the stripe pattern of the bearing alloy and the overlay material regions.

(2) In the above embodiments, although the bearing alloy layers 2, 20 has been etched to a depth of 20 μm, respectively, the etching depth is adjustable within a depth range of 5 to 50 μm by appropriately changing the etching conditions.

(3) In the above embodiments, although the recesses 5, 50 are formed so as to extend circumferentially and linearly on the inner surface of the respective bearing alloy layers, they are not always restricted to have such a circumferential and linear form but may be also those angled to the circumferential direction or those curved.

What is claimed is:

1. A plain bearing comprising a back metal, a bearing alloy layer and an overlay layer, in which the bearing alloy layer and the overlay layer are formed on the inner surface of the back metal in this order, wherein:

the inner surface of the bearing alloy is provided with a plural types of circumferential recessed zone which comprise a zone type of broad width recesses and another zone type of narrow width recesses each extending circumferentially, and the recesses are filled with the overlay material.

2. A plain bearing according to claim 1, wherein an intermediate layer is provided between the bearing alloy layer and the overlay layer, the intermediate layer being made of a metal comprising Ni and Ag.

3. A plain bearing according to claim 2, wherein the circumferential recesses are of grooves.

4. A plain bearing according to claim 3, wherein the plural zone types of circumferential recesses consist of alternately arranged two groups, a first group of which consists of a plural rows of the narrow recesses and a second group of which consists of a plural rows of the broad recesses.

5. A plain bearing according to claim 2, wherein the plural zone types of circumferential recesses consist of alternately arranged two groups, a first group of which consists of a plural rows of the narrow recesses and a second group of which consists of a plural rows of the broad recesses.

6. A plain bearing according to claim 1, wherein the circumferential recesses are of grooves.

7. A plain bearing according to claim 6, wherein the plural zone types of circumferential recesses consist of alternately arranged two groups, a first group of which consists of a plural rows of the narrow recesses and a second group of which consists of a plural rows of the broad recesses.

8. A plain bearing according to claim 1, wherein the plural zone types of circumferential recesses consist of alternately arranged two groups, a first group of which consists of a plural rows of the narrow recesses and a second group of which consists of a plural rows of the broad recesses.

9. A plain bearing according to claim 1, wherein the plural zone types of circumferential recesses consist of alternately arranged two groups, a first group of which consists of a plural rows of the narrow recesses and a second group of which consists of a plural rows of the broad recesses.

\* \* \* \* \*